US010601119B2

(12) United States Patent
Shi et al.

(10) Patent No.: US 10,601,119 B2
(45) Date of Patent: Mar. 24, 2020

(54) ANTENNA SYSTEM AND MOBILE TERMINAL

(71) Applicant: AAC Technologies Pte. Ltd., Singapore (SG)

(72) Inventors: Dawei Shi, Shenzhen (CN); Kai Dong, Shenzhen (CN); Mingjun Hang, Shenzhen (CN); Yufei Zhu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/524,088

(22) Filed: Jul. 28, 2019

(65) Prior Publication Data

US 2020/0052380 A1 Feb. 13, 2020

(30) Foreign Application Priority Data

Aug. 12, 2018 (CN) .................... 2018 2 1294952 U

(51) Int. Cl.
*H04M 1/00* (2006.01)
*H01Q 1/24* (2006.01)
*H01Q 1/36* (2006.01)
*H01Q 21/30* (2006.01)
*H01Q 9/04* (2006.01)
*H01Q 21/00* (2006.01)

(52) U.S. Cl.
CPC ............... *H01Q 1/243* (2013.01); *H01Q 1/36* (2013.01); *H01Q 9/0414* (2013.01); *H01Q 9/0442* (2013.01); *H01Q 21/0006* (2013.01); *H01Q 21/30* (2013.01)

(58) Field of Classification Search
CPC ...... H01Q 1/243; H01Q 1/242; H01Q 13/106; H01Q 1/50; H01Q 1/36; H01Q 9/0414; H01Q 9/0442; H01Q 21/0006; H01Q 21/30
See application file for complete search history.

(56) References Cited

U.S. PATENT DOCUMENTS 5,874,920 A * 2/1999 Araki ..................... H01Q 1/243 343/702
8,599,086 B2 * 12/2013 Wong ..................... H01Q 1/243 343/702
9,799,964 B2 * 10/2017 Jang ....................... H01Q 21/30
10,038,245 B2 * 7/2018 Choi ....................... H01Q 1/243
10,297,906 B2 * 5/2019 Lee ........................ H04M 1/026

* cited by examiner

*Primary Examiner* — Nhan T Le
(74) *Attorney, Agent, or Firm* — W&G Law Group LLP

(57) ABSTRACT

An antenna system applied to a mobile terminal. The mobile terminal comprises a back shell, a main board received in the back shell, a bracket arranged between the back shell and the main board, and a metal wiring arranged on the surface of the bracket. A clearance area is arranged at one end of the main board; an orthographic projection of the metal wiring on the main board is located in the clearance area. The main board is provided with a grounding switch and a feeding point. The metal wiring comprises a body part, a first branch for generating low-frequency resonance, a second branch for generating high-frequency resonance and a third branch for generating medium-frequency resonance. The first branch, the second branch and the third branch respectively extend from the body part to two sides. The grounding switch and the feeding point are connected with the body part.

18 Claims, 6 Drawing Sheets

ANTENNA SYSTEM AND MOBILE TERMINAL

TECHNICAL FIELD

The present disclosure relates to the technical field of antennas, and particularly, to an antenna system and a mobile terminal.

BACKGROUND

A device which is an antenna always exists in wireless communication equipment and is used for radiating electromagnetic energy to a space and receiving the radiating electromagnetic energy from the space. The antenna has a function of transmitting digital or analog signals which are modulated to radio frequency to a space wireless channel or receiving the digital or analog signals which are modulated to radio frequency from the space wireless channel.

However, medium frequency and high frequency share an antenna branch in a PIFA antenna in the related art, in which only one resonance is generated, so that the PIFA antenna can hardly cover the required frequency bands.

Therefore, it is necessary to provide a novel antenna system to solve the above problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding portions throughout the several views.

DESCRIPTION OF EMBODIMENTS

The present invention will be further illustrated with reference to the accompanying drawings and the embodiments.

Figure 1:
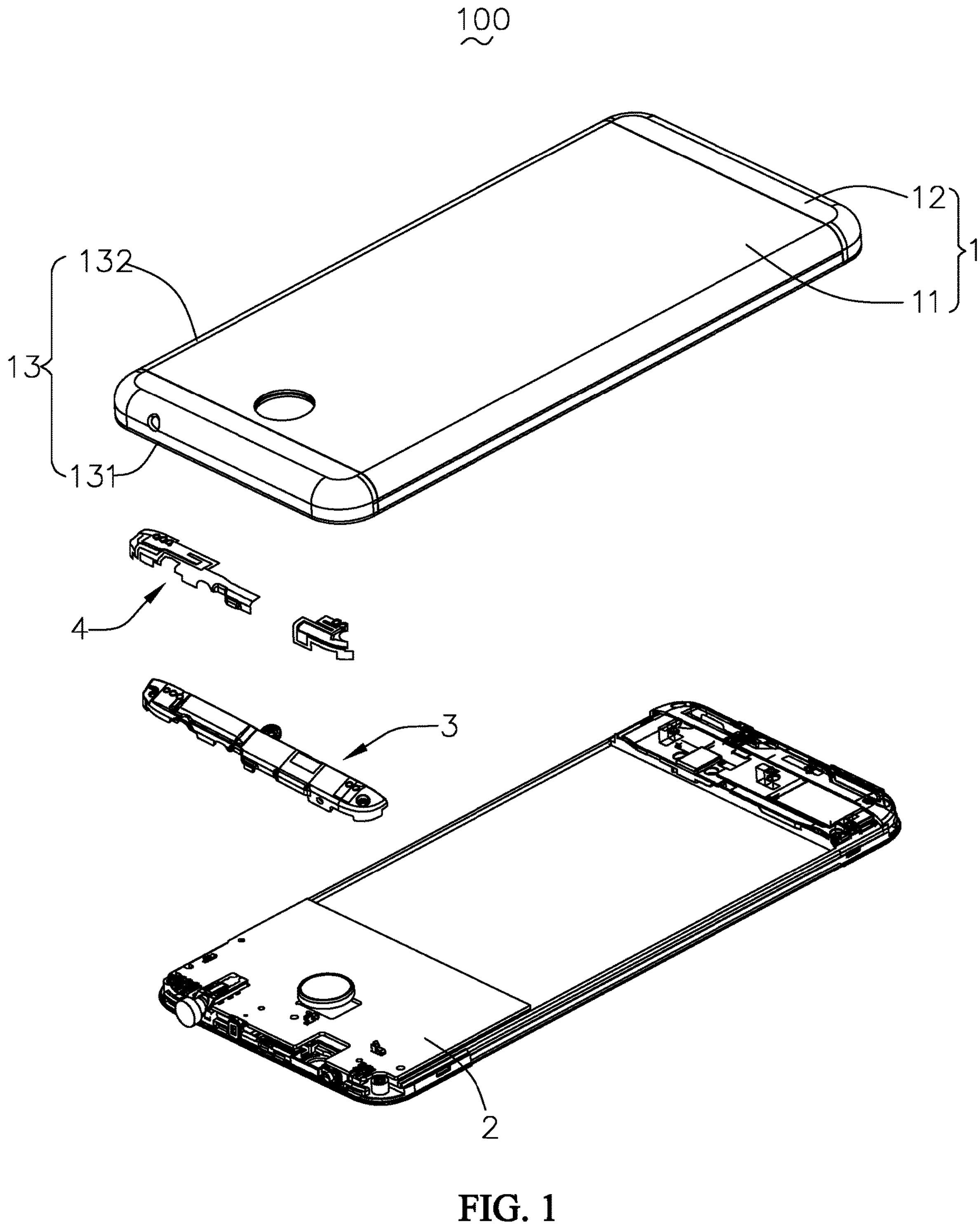
FIG. 1 is a perspective decomposition diagram of a mobile terminal according to the present disclosure.
Figure 2:
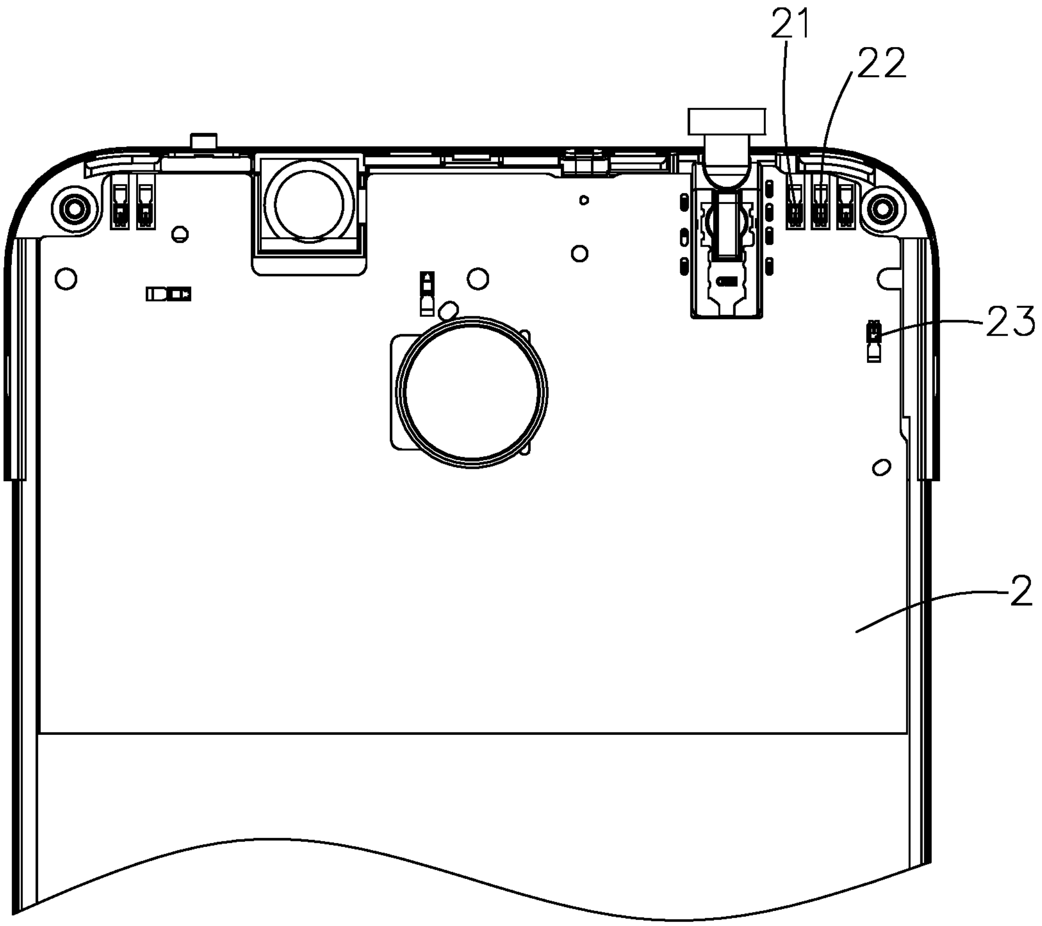
FIG. 2 is a partial structural schematic diagram of the mobile terminal according to the present disclosure.
Figure 3:
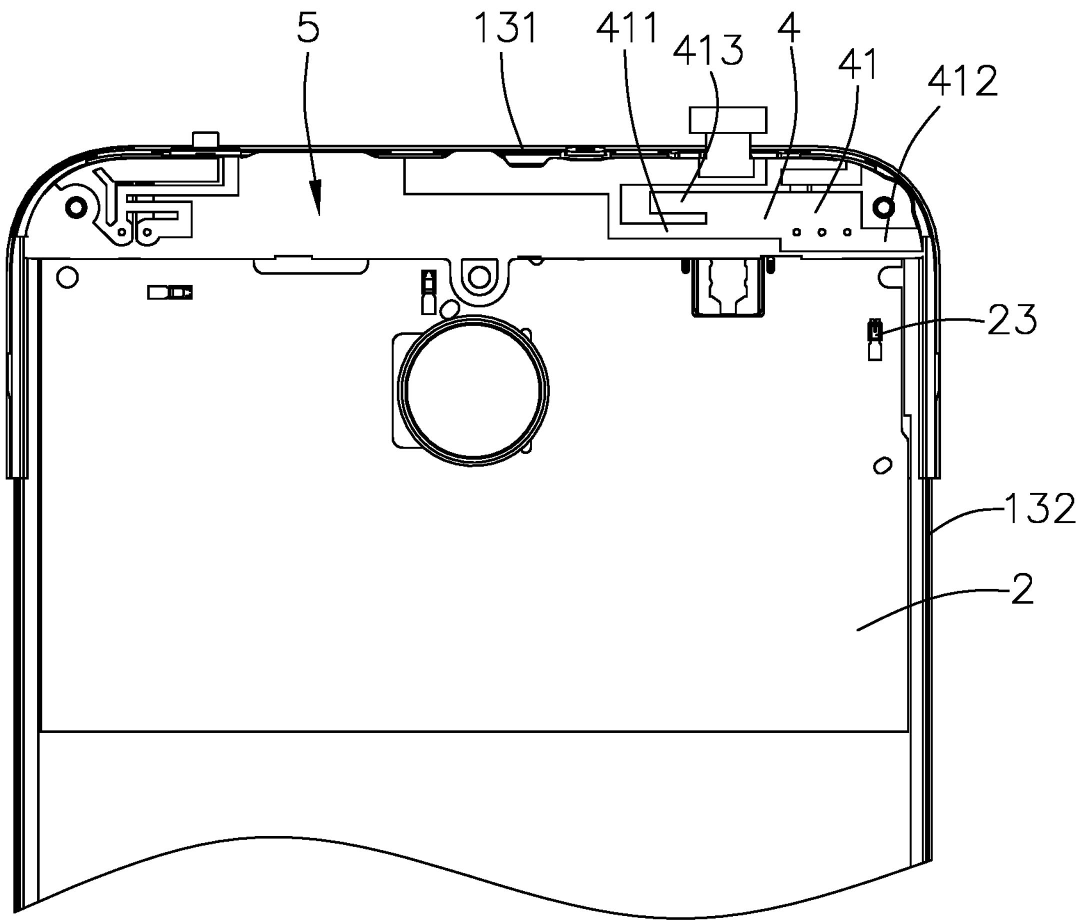
FIG. 3 is another schematic diagram of a part of the structure of the mobile terminal according to the present disclosure.

With reference to FIG. 1, FIG. 2 and FIG. 3, the embodiments of the present disclosure provide an antenna system applied to a mobile terminal 100; the mobile terminal 100 can be a mobile phone. The mobile terminal 100 includes a back shell 1, a main board 2 received in the back shell 1, a bracket 3 arranged between the back shell 1 and the main board 2, and a metal wiring 4 arranged on a surface of the bracket 3. It is appreciated that the mobile terminal 100 also includes components such as a display screen, a microphone and a loudspeaker which are not described here through drawings one by one.

The back shell 1 includes a metal part 11 located in the middle and plastic parts 12 located at two ends of the metal part 11. The length of the back shell 11 is 156 mm, and the width of the back shell 11 is 75 mm. The widths of the plastic parts 12 are 10.5 mm, and the widths of the plastic parts 12 are the widths of the plastic parts 12 along a long-axis direction of the back shell 1.

The main board 2 is provided with a grounding switch 21 and a feeding point 22; the grounding switch 21 and the feeding point 22 are connected with the metal wiring 4. Specifically, the metal wiring 4 is connected with the grounding switch 21 and the feeding point 22 through sprung legs. A clearance area 5 is arranged at one end of the main board 2 corresponding to the metal wiring 4, the clearance area is arranged corresponding to the plastic parts 12, and the widths of the plastic parts 12 are each greater than the width of the clearance area 5. In the specific embodiment of the present disclosure, the width of the clearance area 5 is 5 mm, and the width of the clearance area 5 is the width of the clearance area 5 along the long-axis direction of the back shell 1.

The main board 2 includes a system ground (not described in the figures), the system ground of the main board 2 is connected with the metal part 11 through three sprung legs 23.

The metal wiring 4 is formed on the bracket 3 by using an LDS (Laser Directed Structuring) process, the bracket 3 is preferably a plastic bracket. An orthographic projection of the metal wiring 4 on the main board 2 is located in the clearance area 5. The metal wiring 4 includes a body part 41, a first branch 411 for generating a low-frequency resonance, a second branch 412 for generating a high-frequency resonance and a third branch 413 for generating a medium-frequency resonance. The first branch 411 and the second branch 412 respectively extend from the body part 41 towards two sides thereof, the third branch 413 extends from one side of the body part 41 from which the first branch 411 is extended. The first branch 411 is bent to form a semi-closed opening, the third branch 413 is wrapped in the semi-closed opening and is spaced from the first branch 411. The grounding switch 21 and the feeding point 22 are connected with the body part 41. In the specific embodiment of the present disclosure, the body part 41 is rectangular. The first branch 411, the second branch 412 and the third branch 413 are arranged, so that the antenna system 100 has two resonances in both the medium frequency and the high frequency, and then radiation frequency of the antenna system 100 covers 790-960 MHz and 1710-2690 MHz, thus the actual needs are met.

Figure 4:
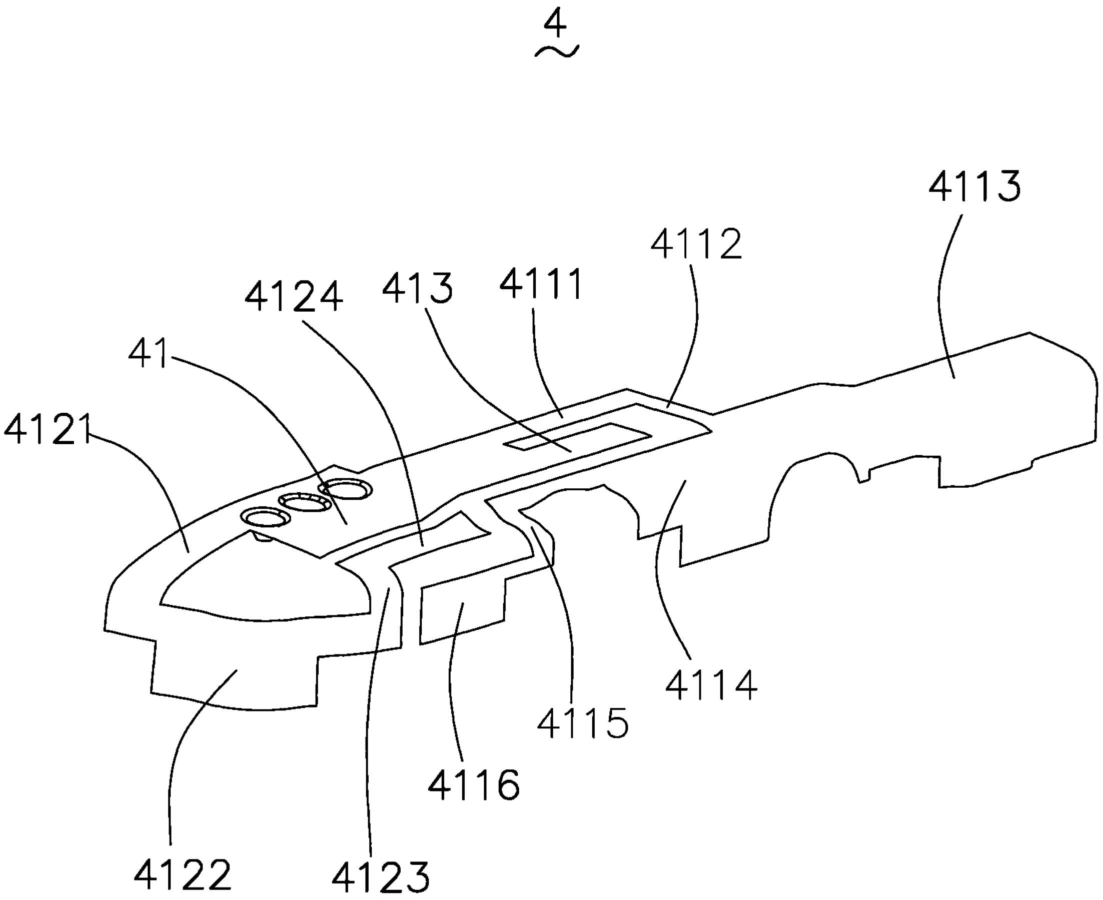
FIG. 4 is a perspective structural diagram of metal wiring according to the present disclosure.

As shown in FIG. 4, the back shell 1 includes a frame 13, the frame 13 includes a short side 131 close to the metal wiring 4 and a long side 132 connected with the short side 131 and close to the metal wiring 4. The first branch 411 includes a first part 4111 extending from the body part 41 and parallel to and spaced from the short side 131, a second part 4112 vertically extending in a direction from the first part 4111 to the short side 131, a third part 4113 and a fourth part 4114 respectively vertically extending from the second part 4112 to two sides parallel to the short side 131, a fifth part 4115 vertically extending in a direction from the fourth part 4114 to the short side 131, and a sixth part 4116 vertically extending from the fifth part 4115 facing away from the fourth part 4114. The third branch 413 is located between the first part 4111 and the fourth part 4114; and the third branch 413 is parallel to both the first part 4111 and the fourth part 4114. The first part 4111, the second part 4112, the third part 4113, the fourth part 4114, the fifth part 4115 and the sixth part 4116 together form the semi-closed opening.

The second branch 412 includes a seventh part 4121 extending in a direction from the body part 41 to the long side 132, an eighth part 4122 bending and extending from the seventh part 4121 and matched with the shape of the frame 13, a ninth part 4123 vertically extending from the eighth part 4122 to the body part 41, and a tenth part 4124 extending in a direction from the ninth part 4123 to the first branch 411 and parallel to and spaced from the short side 131. The tenth part 4124 is located between the body part 41 and the sixth part 4116 and is spaced from both the body part 41 and the sixth part 4116.

Figure 5:
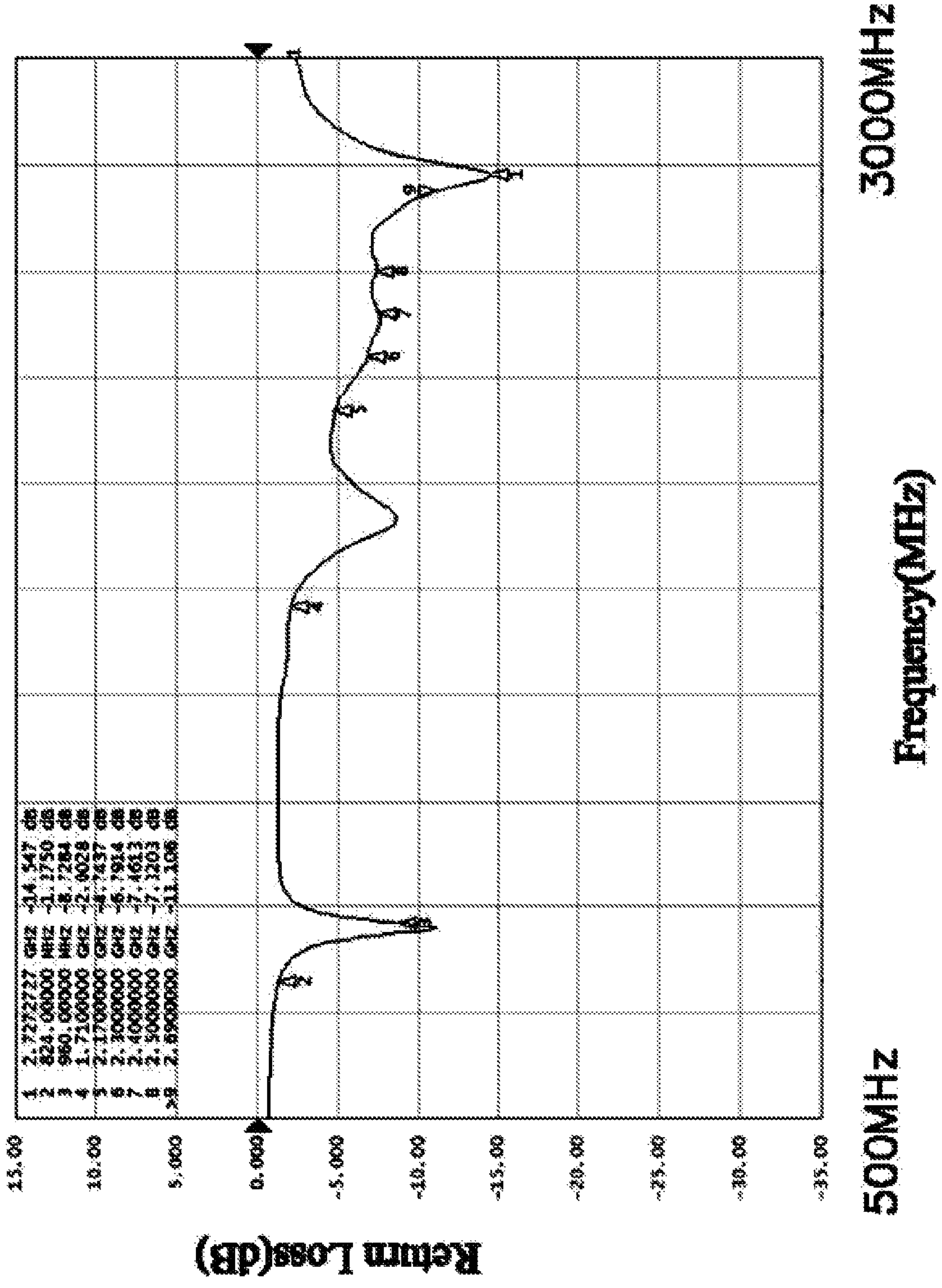
FIG. 5 is a return loss diagram of an antenna system according to the present disclosure.
Figure 6:
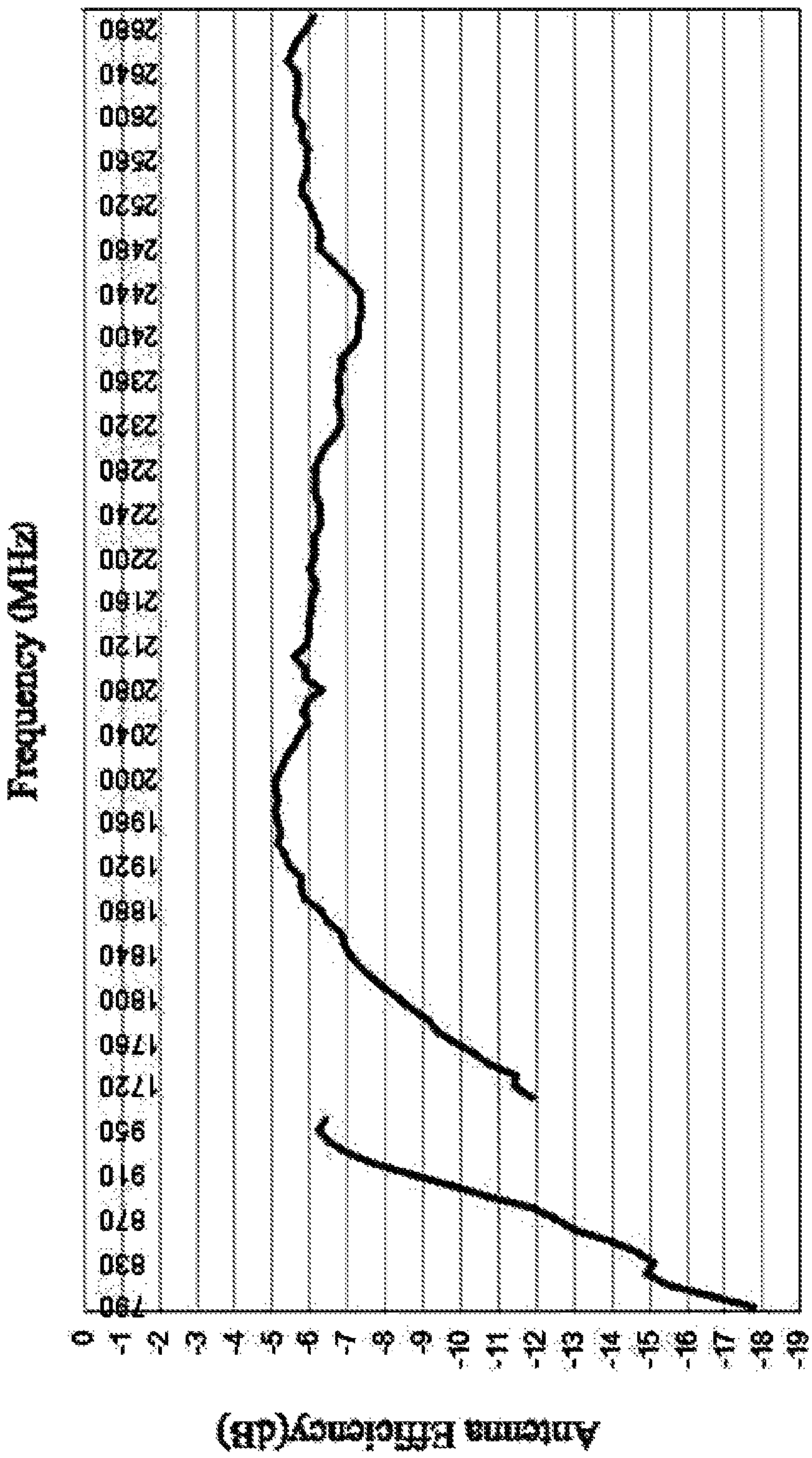
FIG. 6 is an antenna efficiency diagram of the antenna system according to the present disclosure.

As shown in FIG. 5 and FIG. 6, two resonances are respectively generated in medium-high frequency bands of 1710-2690 MHz. Meanwhile, the antenna efficiency of the antenna system 100 is high in the medium-high frequency bands of 1710-2690 MHz.

The mobile terminal 100 includes the antenna system. The mobile terminal 100 can be various portable electronic products such as mobile phones, IPDA, computers and the like.

Compared with the related art, the antenna system is provided with three branches for respectively generating low frequency, medium frequency and high frequency, so that two resonances can be generated in the medium frequency and the high frequency, and the antenna system can cover required frequency bands.

The above described embodiments are merely embodiments of the present disclosure. It should be noted that those of ordinary skill in the art can make improvements without departing from the inventive concept of the present disclosure, and the improvements belong to the protection scope of the present disclosure.

What is claimed is:

1. An antenna system, applied to a mobile terminal, wherein the mobile terminal comprises:

a back shell;

a main board received in the back shell;

a bracket arranged between the back shell and the main board; and a metal wiring arranged on a surface of the bracket;

wherein a clearance area is arranged at one end of the main board corresponding to the metal wiring; the main board is provided with a grounding switch and a feeding point; the metal wiring comprises a body part, a first branch configured to generate a low-frequency resonance and a second branch configured to generate a high-frequency resonance; the first branch and the second branch respectively extend from the body part towards two sides thereof; the metal wiring further comprises a third branch configured to generate a medium-frequency resonance; the third branch extends from one side of the body part from which the first branch extends; the first branch is bent to form a semi-closed opening; the third branch is wrapped in the semi-closed opening and is spaced from the first branch; and the grounding switch and the feeding point are connected to the body part.

2. The antenna system as described in claim 1, wherein a radiation frequency of the antenna system covers 790-960 MHz and 1710-2690 MHz.

3. The antenna system as described in claim 1, wherein a width of the clearance area is 5 mm.

4. The antenna system as described in claim 1, wherein the back shell comprises a metal part located in a middle position and plastic parts located at two ends of the metal part; the clearance area is arranged corresponding to the plastic parts; and the plastic parts each have a greater width than the clearance area.

5. The antenna system as described in claim 4, wherein the main board is connected to the metal part through three sprung legs.

6. The antenna system as described in claim 1, wherein the metal wiring is formed on the bracket by using an LDS process.

7. The antenna system as described in claim 1, wherein the back shell comprises a frame; the frame comprises a short side close to the metal wiring and a long side connected with the short side and close to the metal wiring; the first branch comprises a first part extending from the body part and parallel to and spaced from the short side, a second part vertically extending in a direction from the first part to the short side, a third part and a fourth part respectively vertically extending from the second part to two sides parallel to the short side, a fifth part vertically extending in a direction from the fourth part to the short side, and a sixth part vertically extending from the fifth part along a direction facing away from the fourth part; and the first part, the second part, the third part, the fourth part, the fifth part and the sixth part together form the semi-closed opening.

8. The antenna system as described in claim 7, wherein the third branch is located between the first part and the fourth part.

9. The antenna system as described in claim 8, wherein the second branch comprises a seventh part extending in a direction from the body part to the long side, an eighth part extending from the seventh part while being bent and matched with a shape of the frame, a ninth part vertically extending from the eighth part to the body part, and a tenth part extending in a direction from the ninth part to the first branch and parallel to and spaced from the short side; and the tenth part is located between the body part and the sixth part and is spaced from both the body part and the sixth part.

10. A mobile terminal, comprising the antenna system as described in claim 1.

11. The mobile terminal as described in claim 10, wherein a radiation frequency of the antenna system covers 790-960 MHz and 1710-2690 MHz.

12. The mobile terminal as described in claim 10, wherein a width of the clearance area is 5 mm.

13. The mobile terminal as described in claim 10, wherein the back shell comprises a metal part located in a middle position and plastic parts located at two ends of the metal part; the clearance area is arranged corresponding to the plastic parts; and the plastic parts each have a greater width than the clearance area.

14. The mobile terminal as described in claim 13, wherein the main board is connected to the metal part through three sprung legs.

15. The mobile terminal as described in claim 10, wherein the metal wiring is formed on the bracket by using an LDS process.

16. The mobile terminal as described in claim 10, wherein the back shell comprises a frame; the frame comprises a short side close to the metal wiring and a long side connected with the short side and close to the metal wiring; the first branch comprises a first part extending from the body part and parallel to and spaced from the short side, a second part vertically extending in a direction from the first part to the short side, a third part and a fourth part respectively vertically extending from the second part to two sides parallel to the short side, a fifth part vertically extending in a direction from the fourth part to the short side, and a sixth part vertically extending from the fifth part along a direction facing away from the fourth part; and the first part, the second part, the third part, the fourth part, the fifth part and the sixth part together form the semi-closed opening.

17. The mobile terminal as described in claim 16, wherein the third branch is located between the first part and the fourth part.

18. The mobile terminal as described in claim 17, wherein the second branch comprises a seventh part extending in a direction from the body part to the long side, an eighth part extending from the seventh part while being bent and matched with a shape of the frame, a ninth part vertically extending from the eighth part to the body part, and a tenth part extending in a direction from the ninth part to the first branch and parallel to and spaced from the short side; and the tenth part is located between the body part and the sixth part and is spaced from both the body part and the sixth part.

* * * * *